US009952835B2

United States Patent
Wang et al.

(10) Patent No.: US 9,952,835 B2
(45) Date of Patent: Apr. 24, 2018

(54) GENERATION OF HYBRID ENTERPRISE MOBILE APPLICATIONS IN CLOUD ENVIRONMENT

(71) Applicant: SAP SE, Walldorf (DE)

(72) Inventors: Qiu Shi Wang, Singapore (SG); Yi Quan Zhou, Singapore (SG); Lin Cao, Singapore (SG)

(73) Assignee: SAP SE, Walldorf (DE)

( * ) Notice: Subject to any disclaimer, the term of this patent is extended or adjusted under 35 U.S.C. 154(b) by 64 days.

(21) Appl. No.: 15/050,509

(22) Filed: Feb. 23, 2016

(65) Prior Publication Data

US 2017/0242665 A1 Aug. 24, 2017

(51) Int. Cl.
G06F 9/44 (2006.01)

(52) U.S. Cl.
CPC ........................... G06F 8/34 (2013.01)

(58) Field of Classification Search
CPC .................................... G06F 8/34; G06F 8/60
USPC .................................................. 717/107, 174
See application file for complete search history.

(56) References Cited

U.S. PATENT DOCUMENTS

| | | | | |
|---|---|---|---|---|
| 7,596,620 B1 * | 9/2009 | Colton | ...................... | G06F 8/10 709/201 |
| 7,694,277 B2 * | 4/2010 | Yuknewicz | ............... | G06F 8/71 717/121 |
| 7,950,010 B2 * | 5/2011 | Goger | ...................... | G06F 8/61 709/220 |
| 8,793,584 B2 * | 7/2014 | Chen | ........................ | G06F 8/20 709/217 |
| 9,069,375 B2 * | 6/2015 | Padmavilasom | ... | H04L 67/2823 |
| 9,471,303 B2 * | 10/2016 | Zhou | ........................ | G06F 8/71 |
| 9,672,032 B2 * | 6/2017 | Zhou | ........................ | G06F 8/76 |

(Continued)

OTHER PUBLICATIONS

Fast Development Platforms and Methods for Cloud Applications—Shigeru Hosono, Service Platforms Research Laboratories, NEC Corporation, Japan; Jiafu He, Xuemei Liu, Lin Li, He Huang, Platform Software Development Division, NEC China Co. Ltd, China;Shuichi Yoshino,Service Development Division, NEC BIGLOBE Co. Ltd, Japan—2011 IEEE.*

(Continued)

Primary Examiner — Francisco Aponte (57) ABSTRACT

Generate hybrid enterprise mobile applications in cloud environment, according to one embodiment. A web application is selected in a web integrated development environment (IDE) executing in a browser. The web application may depend on various components and the dependent build components may reside on different repositories. Dependency analysis engine determines the dependent build components corresponding to the web application. The component retrieval engine retrieves the dependent build components from corresponding repositories to memory or cache of the browser where the web IDE is executing. Component build engine builds the dependent build components to a build result. Packaging engine packages the build result to a single package as an application asset package. The application asset package is received in a platform dependent build service. The application asset package is built as a hybrid mobile application in the platform dependent build service. The hybrid mobile application is published in an application store.

18 Claims, 8 Drawing Sheets

(56) References Cited

U.S. PATENT DOCUMENTS

| | | | | |
|---|---|---|---|---|
| 2006/0212864 A1* | 9/2006 | Calahan | G06F 9/44521 | 717/167 |
| 2007/0006217 A1* | 1/2007 | Tammana | G06F 8/61 | 717/174 |
| 2007/0011650 A1* | 1/2007 | Hage | G06F 8/38 | 717/104 |
| 2007/0101197 A1* | 5/2007 | Moore | G06F 8/61 | 714/38.1 |
| 2008/0127171 A1* | 5/2008 | Tarassov | G06F 8/60 | 717/174 |
| 2008/0147671 A1* | 6/2008 | Simon | G06F 17/30899 | |
| 2011/0185339 A1* | 7/2011 | Andrade | G06F 8/20 | 717/104 |
| 2011/0225488 A1* | 9/2011 | Schluter | G06F 8/51 | 715/239 |
| 2011/0265077 A1* | 10/2011 | Collison | G06F 8/71 | 717/172 |
| 2011/0283194 A1* | 11/2011 | Chen | G06F 8/61 | 715/735 |
| 2012/0096433 A1* | 4/2012 | Reinhold | G06F 8/71 | 717/120 |
| 2013/0067459 A1* | 3/2013 | Sannidhanam | G06F 8/61 | 717/176 |
| 2013/0219415 A1* | 8/2013 | Jeon | G06F 9/541 | 719/328 |
| 2013/0275623 A1* | 10/2013 | Stoilov | G06F 8/61 | 709/246 |
| 2013/0311984 A1* | 11/2013 | Kaiwar | G06F 8/65 | 717/172 |
| 2014/0047517 A1* | 2/2014 | Ding | H04L 12/1453 | 726/5 |
| 2014/0053126 A1* | 2/2014 | Watson | G06F 8/30 | 717/102 |
| 2014/0109115 A1* | 4/2014 | Low | G06F 9/541 | 719/328 |
| 2014/0201328 A1* | 7/2014 | Zhao | H04W 4/003 | 709/219 |
| 2014/0282395 A1* | 9/2014 | Wang | G06F 8/71 | 717/120 |
| 2014/0297713 A1* | 10/2014 | Meigen | G06F 8/20 | 709/203 |
| 2015/0067641 A1* | 3/2015 | Nyisztor | H04L 41/082 | 717/121 |
| 2015/0082298 A1* | 3/2015 | Wang | G06F 8/60 | 717/174 |
| 2015/0089475 A1* | 3/2015 | Geng | G06F 17/30011 | 717/121 |
| 2015/0113504 A1* | 4/2015 | Artzi | G06F 8/60 | 717/120 |
| 2015/0347119 A1* | 12/2015 | Wang | G06F 8/65 | 717/120 |
| 2016/0048388 A1* | 2/2016 | Eksten | G06F 8/70 | 717/105 |
| 2016/0154629 A1* | 6/2016 | Noens | G06F 8/30 | 717/107 |
| 2016/0156700 A1* | 6/2016 | Chen | H04L 67/10 | 726/3 |
| 2016/0164994 A1* | 6/2016 | Aizenberg | H04L 67/2823 | 709/203 |
| 2016/0164999 A1* | 6/2016 | Alger | H04L 67/2857 | 709/217 |
| 2016/0224335 A1* | 8/2016 | Zhou | G06F 8/76 | |
| 2016/0253171 A1* | 9/2016 | Zang | H04L 67/02 | 717/101 |

OTHER PUBLICATIONS

A Comparative Analysis of Cross-platform Development Approaches for Mobile Applications—Spyros Xanthopoulos Directorate of Technical Services and Computerization Aristotle University of Thessaloniki 54124 Thessaloniki, Greece—Stelios Xinogalos Department of Applied Informatics University of Macedonia 54006 Thessaloniki, Greece—BCI 2013.*
Development of Agnostic Mobile Applications With Cross-Platform Cloud Computing Platforms—Mohamed Nuh; Lappeenranta University of Technology Faculty of Technology Management, Degree program of Information Technology—Master's Thesis 2014.*
Architecture for Cloud-Based Rapid Application Development Framework BY Isaac Gachugu Gathia P58/73002/2009—University of Nairobi School of Computing and Informatics MSc Computer Science—Master of Science in Computer Science—2012.*
Developing Portable Tizen Apps—Companion to Tizen Application Portability and JavaScripting Tizen Web Apps; Michael Schloh von Bennewitz, Apr. 28, 2013, Version 0.93.*

* cited by examiner

```
{
  cacheControl : [{ maxAge : 86400 }],
  routes : [
    {
      path : /x/y/z ,
      target :{ type : application , name : dependent build component A , entryPath : /x/y/z },
      description : dependent build component A
    },                                                                                            ⎬ 402
    {
      path : /a/b/c/d/e/f ,
      target :{ type : application , name : dependent build component B , entryPath : /a/b/c/d/e/f },
      description : dependent build component B
    },                                                                                            ⎬ 404
    {
      path : /j/k/l/m/n/o ,
      target :{ type : resource , name : dependent build component C , entryPath : /j/k/l/m/n/o },
      description : dependent build component C
    }                                                                                             ⎬ 406
  ]
}
```

FIG. 8

GENERATION OF HYBRID ENTERPRISE MOBILE APPLICATIONS IN CLOUD ENVIRONMENT

FIELD

Illustrated embodiments generally relate to data processing, and more particularly to a system to generate hybrid enterprise mobile applications in cloud environment.

BACKGROUND

Enterprises provide development tools that enable developers with end-to-end development process. Browser based development tools enable designing and development of enterprise applications through simplified user interfaces. During development of applications, developers work on, for example generate, build and execute the application. The steps of developing, generating build and executing application are iterative by nature. In the iterative development process it is a challenge to identify the dependencies of the application. Further, in the development environment, changes to the application are dynamic. Therefore, it is challenging to dynamically identify the dependencies to the dynamic application in an iterative development environment.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Embodiments of techniques for generation of hybrid enterprise mobile applications in cloud environment are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
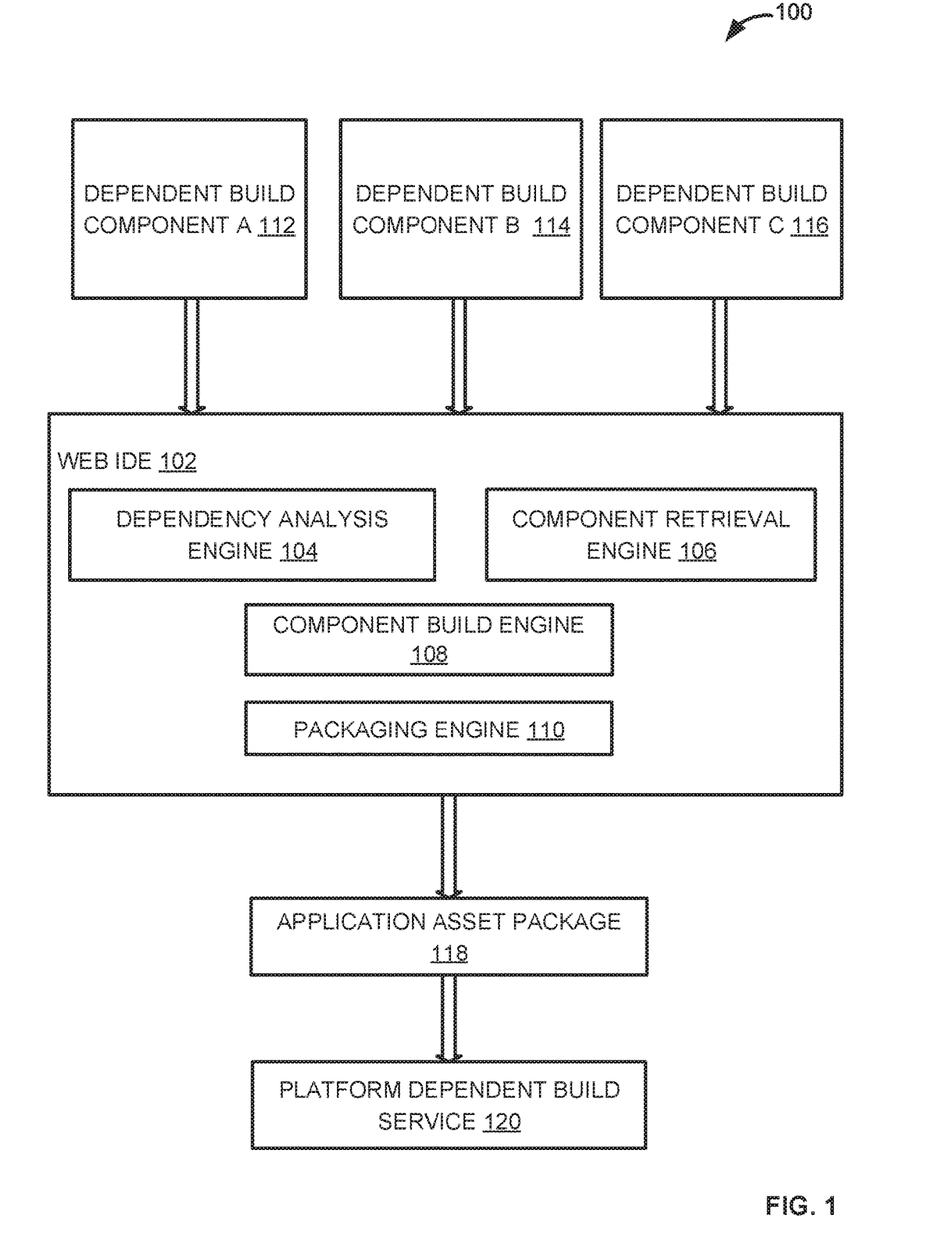
FIG. 1 is a block diagram illustrating architecture of various components for generating hybrid enterprise mobile applications in cloud environment, according to one embodiment.

FIG. 1 is a block diagram 100 illustrating architecture of various components for generating hybrid enterprise mobile applications in cloud environment, according to one embodiment. The architecture is shown containing web integrated development environment (IDE) 102 that is a browser based development environment. Web IDE 102 is a source code editor with preconfigured development environment enabling end-to-end development lifecycle such as prototyping, developing, testing, packaging, deploying and extending applications. The web IDE 102 implements a set of mobile application development capabilities providing a hybrid development environment. The hybrid development environment enables applications to be developed and tested on various mobile operating system platform emulators and simulators. The hybrid enterprise mobile applications are capable of being executed on various mobile operating system platforms, various desktop operating system platforms, etc. The web IDE 102 provides a development environment for in-memory cloud platform also referred to as a platform as a service offering (PaaS). The web IDE 102 provides both a development and runtime environment for in-memory cloud applications. The in-memory cloud applications are executed on in-memory database, for example SAP Hana® where data is stored in a volatile memory such as a random access memory (RAM). Multi-core central processing units may further accelerate speed of execution of the in-memory cloud applications.

In one embodiment, when a web application is selected, dependency analysis engine 104, component retrieval engine 106, component build engine 108 and packaging engine 110 are executed in a sequence in the web IDE 102. The dependency analysis engine 104 analyzes configuration files in the web application. The web application may depend on various components and the dependent build components may reside on different locations or repositories. The dependency analysis engine 104 analyzes configuration files to identify dependent build components required by the web application, and also identifies locations where the components are available. The dependent build components required by the web application are dependent build component A 112, dependent build component B 114, and dependent build component C 116. The components required by the enterprise mobile application are generated as a list of dependent build components. The list of dependent build components is sent to the component retrieval engine 106 for processing.

The component retrieval engine 106 retrieves the dependent build components from corresponding repositories to memory or cache of the browser where web IDE 102 is executing. The memory or cache of the browser, caches or stores the retrieved dependent build components. Volatile memory such as random access memory can be used to cache data in the browser. Size allocated in the random access memory determines the capacity and speed of caching the retrieved components. Component build engine 108 fetches the dependent build components retrieved to the memory of the browser, and builds the components to a build result. Build process may include compilation, reducing file size, etc., of the dependent build components for better performance. Packaging engine 110 packages the build result into an application asset package 118. The application asset package 118 is a single file including all the dependent build components for the web application. From the web IDE 102 the application asset package 118 is sent to platform dependent build service 120 to build a platform specific build result. The application asset package 118 is built as a hybrid mobile application in the platform dependent build service 120. The hybrid mobile application is published in an application store. The hybrid mobile application published in the application store can be distributed to a variety of computing handheld devices such as mobile phones, personal digital assistants, smart watches, etc., and other computing devices such as desktop computers, etc. The computing handheld devices and other computing devices may also be referred to as cloud clients. The hybrid mobile application can be executed on various mobile platforms. The hybrid mobile application can be executed on any mobile device in an online mode and as well as in an offline mode. The hybrid mobile application may be used in the iterative development process for further development. For example, in an ongoing iterative development effort where software code changes are performed in the web application iteratively, the dependencies are identified and automatically packaged as the hybrid mobile application.

It should be appreciated that the dependency analysis engine 104, component retrieval engine 106, component build engine 108 and packaging engine are not limited to the examples explained below, various other implementations may also be performed. The dependency analysis engine 104, component retrieval engine 106, component build engine 108 and packaging engine may be executed in various orders or not in sequence depending on the implementation in the web IDE 102. Implementation of the engines may include a combination of software program logic and hardware components enabling various functionalities of the engines as explained below. In one embodiment, web IDE 102 with engine functionalities can be deployed in a server system/cloud server accessing in-memory database where data is stored in a volatile memory such as a random access memory (RAM). In one embodiment, the dependency analysis engine 104, the component retrieval engine 106, the component build engine 108 and the packaging engine 110 in the web IDE may be executed in a first system. The platform dependent build service 120 used to build a platform specific build result may be executed in a second system. The application store may be available in a third system. It should be appreciated that the first system, second system and third system am merely indicative numerals and may be combined in one or more systems depending on the nature of implementation.

Figure 2:
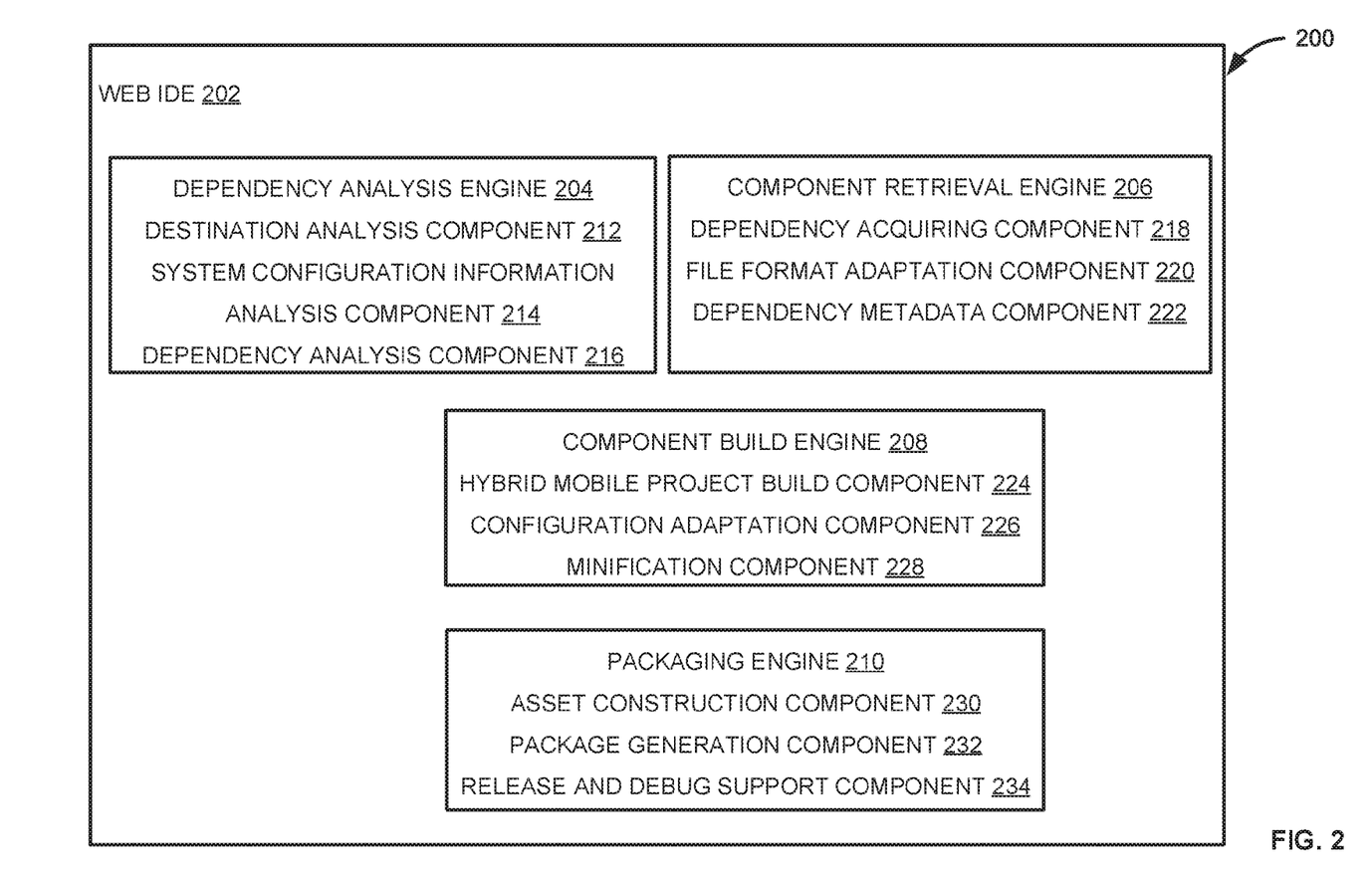
FIG. 2 is a block diagram illustrating various components included in engines of web IDE, according to one embodiment.

FIG. 2 is block diagram 200 illustrating various components included in engines of web IDE, according to one embodiment. The web IDE 202 is shown containing dependency analysis engine 204, component retrieval engine 206, component build engine 208 and packaging engine 210. When an enterprise mobile application is selected, a list of dependent build components is generated by the dependency analysis engine 204. Destination analysis component 212 in the dependency analysis engine 204 is used to analyze and identify source repositories corresponding to the dependent build components. System configuration information analysis component 214 is used to analyze system name, path, source repository name, etc., corresponding to the identified source repositories. Dependency analysis component 216 is used to recursively analyze dependencies of each identified dependent build component to identify nested dependencies of the each identified dependent build component. Dependency may be a relationship between the identified dependent build component and various other components, where the identified dependent build component refers to the various other components. When the dependency analysis engine 204 completes the analysis, the component retrieval engine 206 retrieves the identified dependent build components from the corresponding repositories.

Dependency acquiring component 218 is used to acquire the assets of the identified dependent build components from the identified source repositories. The acquired assets are transmitted to the memory of the browser. File format adaptation component 220 enables adaptation of file format of the acquired assets during the transmission. Dependency metadata component 222 is used to analyze the acquired assets of the dependent build components, and generate metadata that is required by component build engine 208. In the component build engine 208, hybrid mobile project build component 224 generates a root page of the enterprise mobile application (i.e. index.html) with bootstrap, script configuration files, script loading sequence, etc. Configuration adaptation component 226 helps to adapt the configuration of scripts and style sheets of components according to the requirements of configuration files of the enterprise mobile application, and the dependent build components. For example, style sheets in basic format are compiled into cascading style sheets (CSS) format as required by a library in the dependent build components. Minification component 228 in the component build engine 208 removes unnecessary characters or minifies files to reduce the file size. For example, script files in the dependent build components are minified from plain text to minification format. Asset construction component 230 in package engine 210 integrates and constructs the asset package file structure according to the enterprise mobile application and configurations of the dependent build components. Package generation component 232 archives and compresses the constructed asset package file to a format required for transmission to platform build services. Release and debug support component 234 adapts the compressed asset package based on the debug or release package specification indicated.

Figure 3:
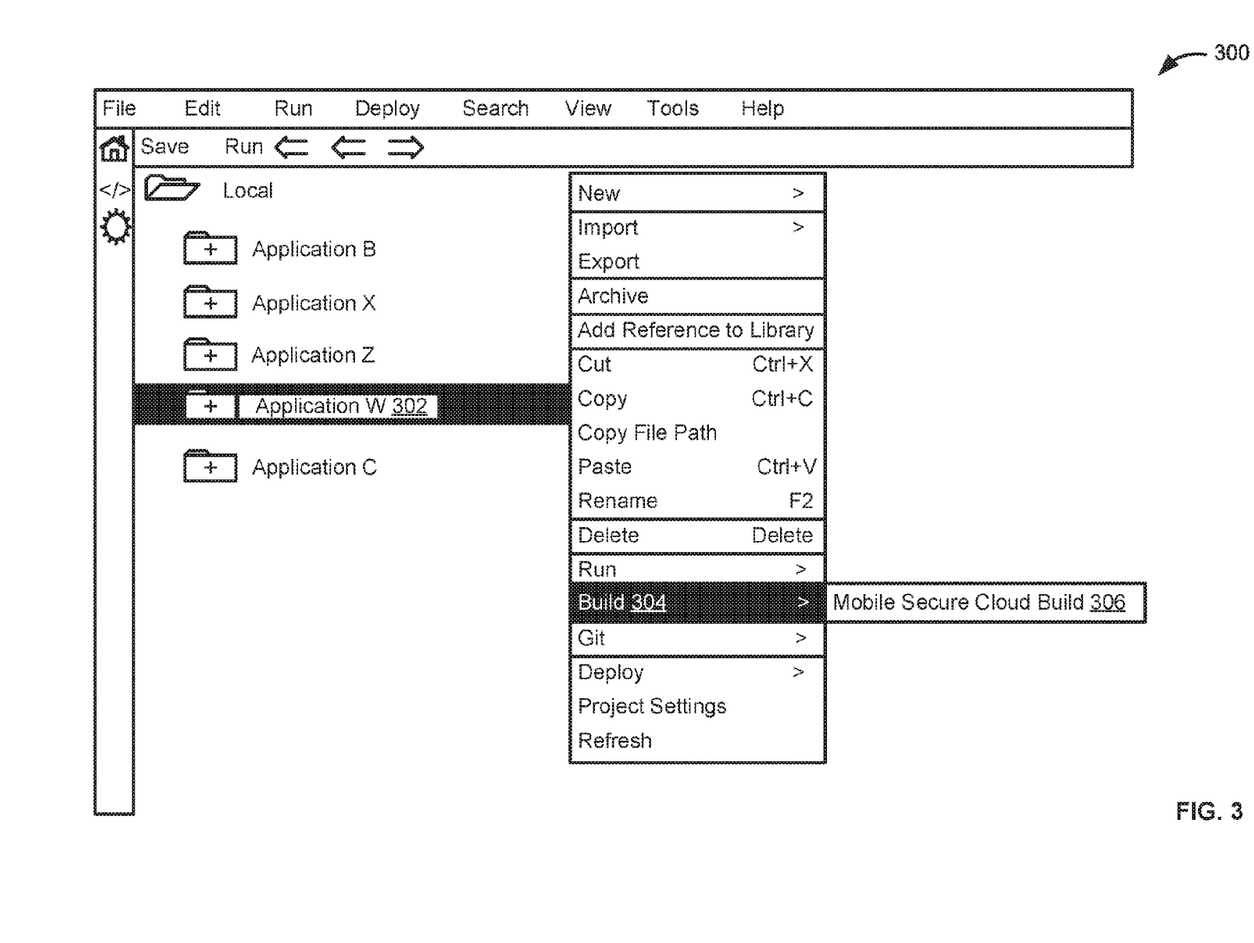
FIG. 3 is a block diagram of user interface illustrating application selection in web IDE, according to one embodiment.

FIG. 3 is a block diagram of user interface 300 illustrating application selection in web IDE, according to one embodiment. The web IDE is launched in a browser, and the user interface is shown displaying various applications such as: application B, application X, application Z, application W and application C. When the user selects application W 302, a context menu is displayed with various menu options such as: new, import, export, run, build, etc. When the user selects build menu item 304, an option mobile secure cloud build menu item 306 is provided. When the user selects the mobile secure cloud build menu item 306, a dependency analysis engine is initiated. The dependency analysis engine analyzes configuration files in the application W 302. The application W 302 has various configuration files such as: configuration file A, configuration file B and configuration file C. For example, the configuration file A is analyzed to identify a list of components required by application W 302 and also location of the components. The configuration file A is analyzed and the list of components such as dependent build component A on repository A, dependent build component B on repository X, dependent build component C in web IDE, etc., are identified.

The list of components such as: dependent build component A on repository A, dependent build component B on repository X, dependent build component C in web IDE, etc., are sent to a component retrieval engine for processing. The component retrieval engine retrieves the list of components from the corresponding repositories. Dependent build component A is retrieved from repository A, dependent build component B is retrieved from repository X, dependent build component C is retrieved from web IDE. The retrieved components are saved in the memory of the web browser running the web IDE. Component build engine fetches the components saved in the memory of the web browser to generate a build result. The build process includes compilation of style sheets, script minification, etc. The script minification reduces the file size of the build result and to improve the performance. The build result is sent to packaging engine. The packaging engine packages the build result into an application asset package.

Figure 4:
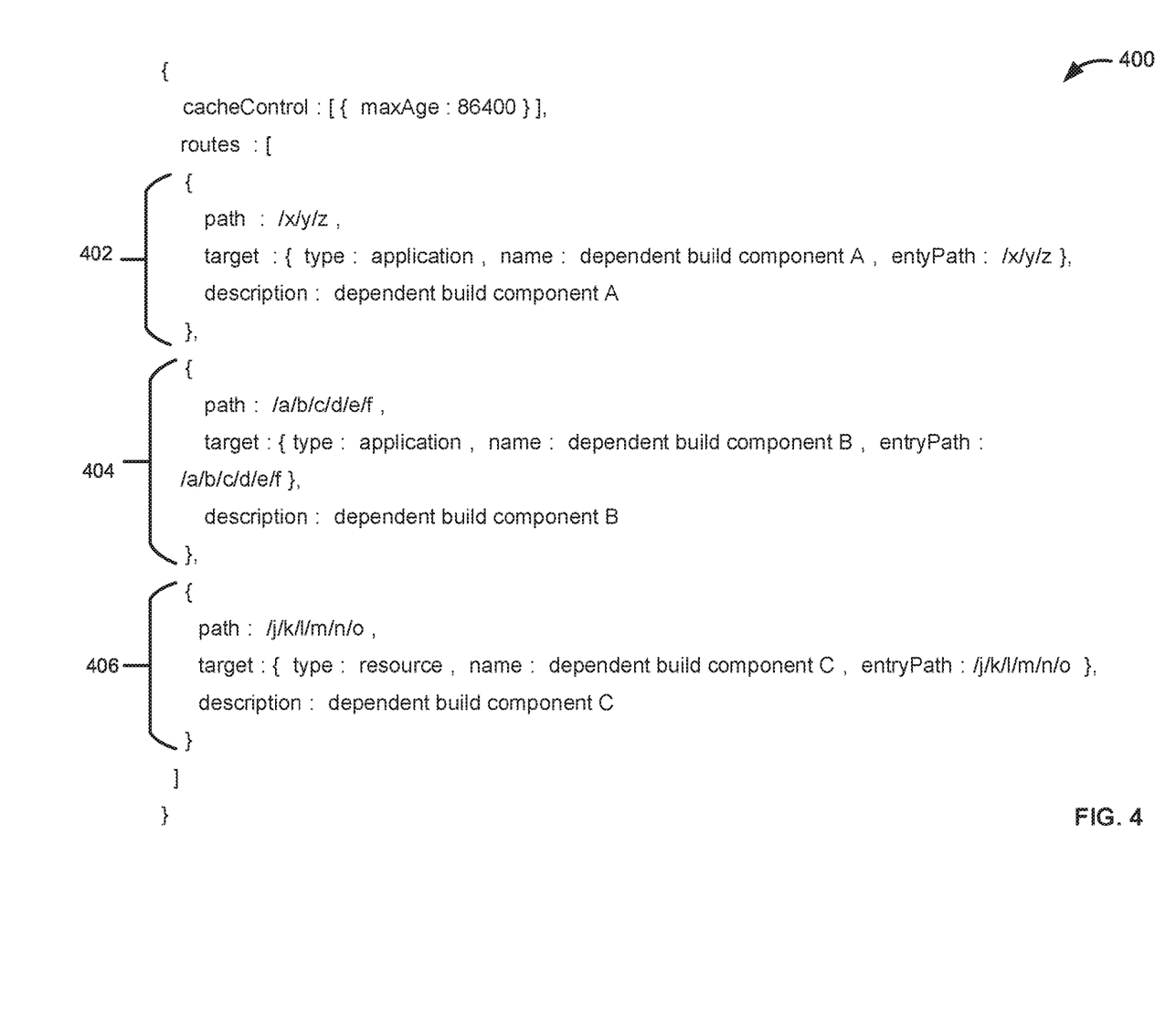
FIG. 4 is a code snippet illustrating a configuration file in a web application, according to one embodiment.

FIG. 4 is a code snippet illustrating a configuration file 400 in a web application, according to one embodiment. Configuration file A is a configuration file corresponding to the web application. The configuration file A is shown including configuration parameters corresponding to the components dependent on the web application. The components such as: dependent build component A, dependent build component B and dependent build component C are the dependent build components corresponding to the web application. Configuration parameters corresponding to the individual dependent build components are indicated in various blocks of code such as block 402, block 404 and block 406 respectively. Block 402 shows configuration parameters such as: "path", "target" and "description" associated with dependent build component A. The dependent build component A is shown with path 'x/y/z', target type as 'application', name as 'dependent build component A' and entry path as 'x/y/z', and description as 'dependent build component A'. Similarly, block 404 shows configuration parameters such as "path", "target" and "description" associated with dependent build component B. The dependent build component B is shown with path 'a/b/c/d/e/f', target type as 'application', name as 'dependent build component B' and entry path as 'a/b/c/d/e/f', and description as 'dependent build component B'. Block 406 shows configuration parameters such as: "path". "target" and "description" associated with dependent build component C. The dependent build component C is shown with path '/j/k/l/m/n/o', target type as 'component', name as 'dependent build component C' and entry path as '/j/k/l/m/n/o', and description as 'dependent build component C'.

Figure 5:
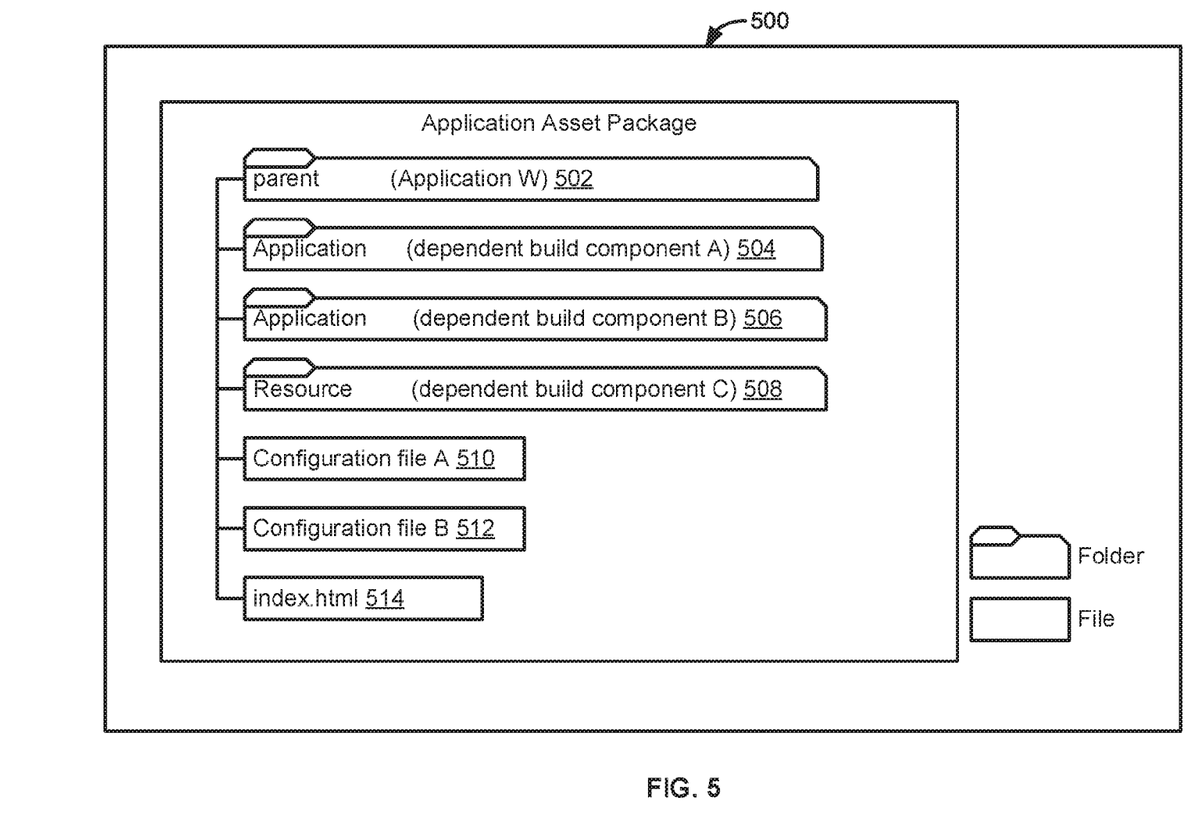
FIG. 5 is a block diagram illustrating an application asset package, according to one embodiment.

FIG. 5 is a block diagram illustrating an application asset package 500, according to one embodiment. Application asset package 500 is integrated and constructed based on web application W 502 and configuration files of the dependent build components. Application asset package 500 is shown including the parent type application W 502, dependent build components such as application type dependent build component A 504, application type dependent build component B 506, component type dependent build component C 508, configuration files such as configuration file A 510 and configuration file B 512, and index.html 514. The dependent build components are compressed in the application asset package to a format suitable for transmission to platform build services. The application asset package 500 is a single file including all the dependent build components for the web application W 502.

Figure 6:
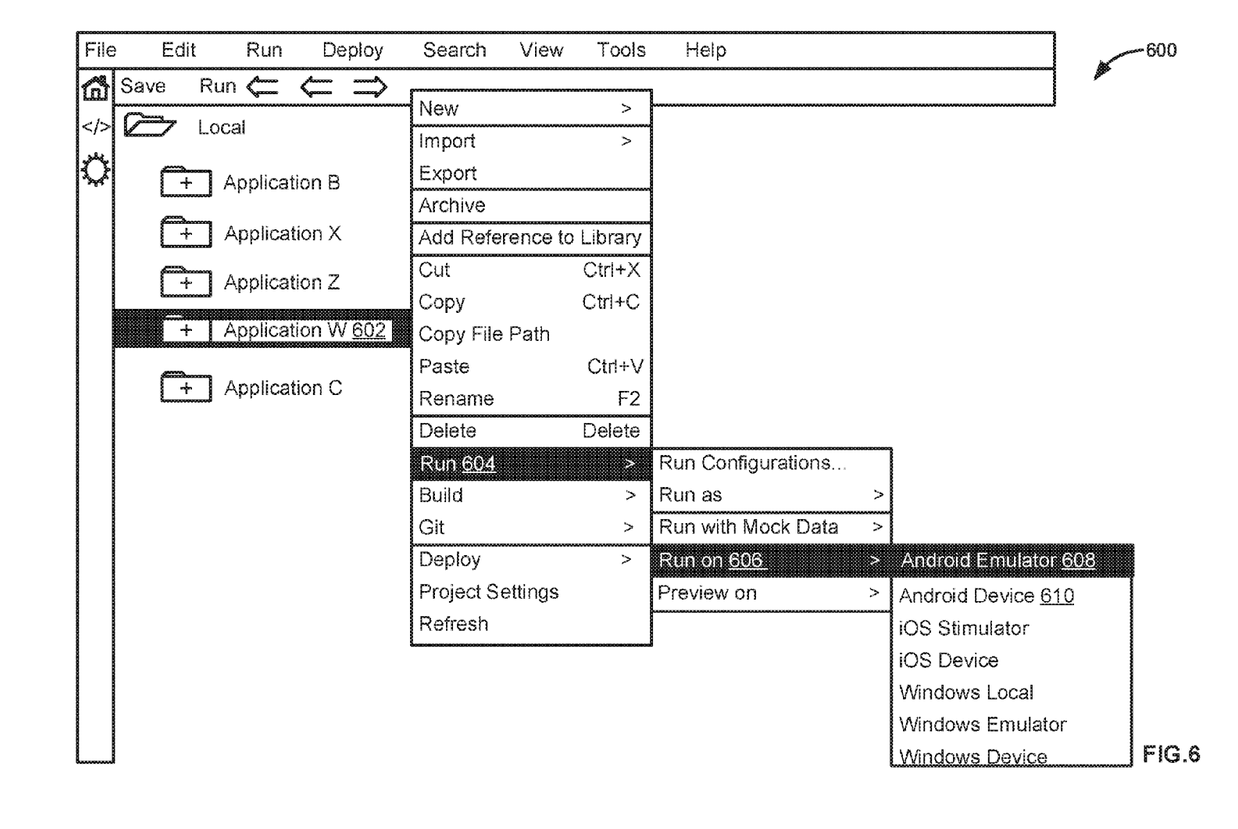
FIG. 6 is a block diagram of user interface illustrating application selection in web IDE, according to one embodiment.

FIG. 6 is a block diagram of user interface 600 illustrating application selection in web IDE, according to one embodiment. The web IDE is launched in a browser, and the user interface is shown displaying various applications such as: application B, application X, application Z, application W and application C. When the user selects application W 602, a context menu is displayed with various menu options such as new, import, export, run, build, etc. When the user selects run menu item 604, an option run on menu item is provided. When the user selects the run on menu item 606, options such as android emulator 608 and android device 610 are provided. When user selects either android emulator 608 or android device 610 the dependency analysis engine analyzes configuration files in the application W 602 as explained in FIG. 3. Based on the analysis, list of components are identified and sent to component retrieval engine. The component retrieval engine retrieves the list of components from the corresponding repositories. The retrieved components are saved in the memory of the web browser running the web IDE. Component build engine fetches the components saved in the memory of the web browser to generate a build result. The packaging engine packages the build result into an application asset package.

Figure 7:
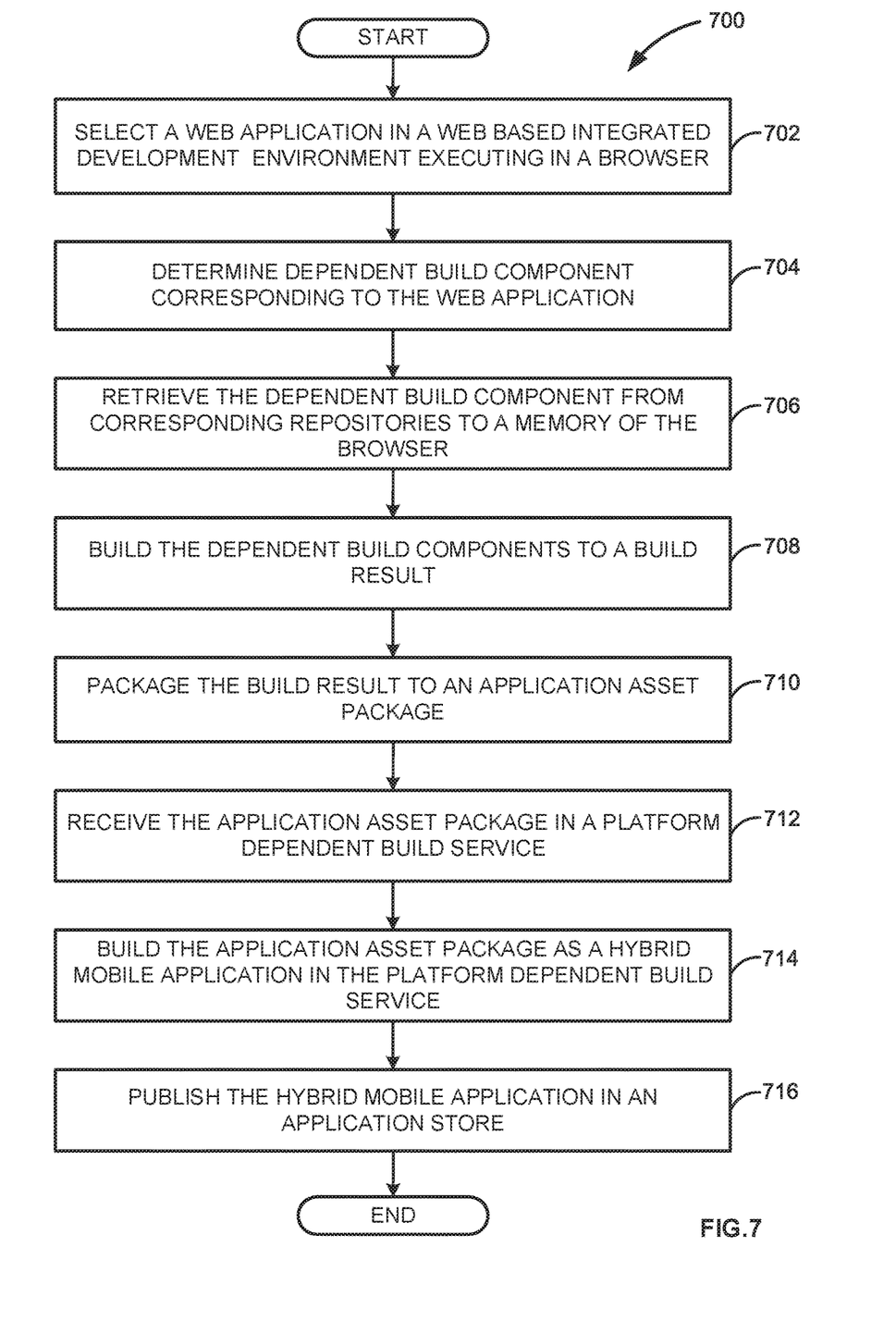
FIG. 7 is a flow diagram illustrating process of dynamic analysis of entities, according to one embodiment.

FIG. 7 is a flow diagram illustrating process 700 of dynamic analysis of entities, according to one embodiment. At 702, a web application is selected in a web based integrated development environment executing in a browser. At 704, dependent build components corresponding to the web application are determined. At 706, the dependent build components are retrieved from corresponding repositories to a memory of the browser. At 708, the dependent build components are built to obtain a build result. At 710, the build result is packaged to an application asset package. At 712, the application asset package is received in a platform dependent build service. At 714, the application asset package is built as a hybrid mobile application in the platform dependent build service. At 716, the hybrid mobile application is published in an application store. The hybrid mobile application may also be referred to as a hybrid computer program product.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java. C++, or other object-oriented programming language and development tools. Another embodiment may be implemented in hard-wired circuitry in place of, or in combination with machine readable software instructions.

Figure 8:
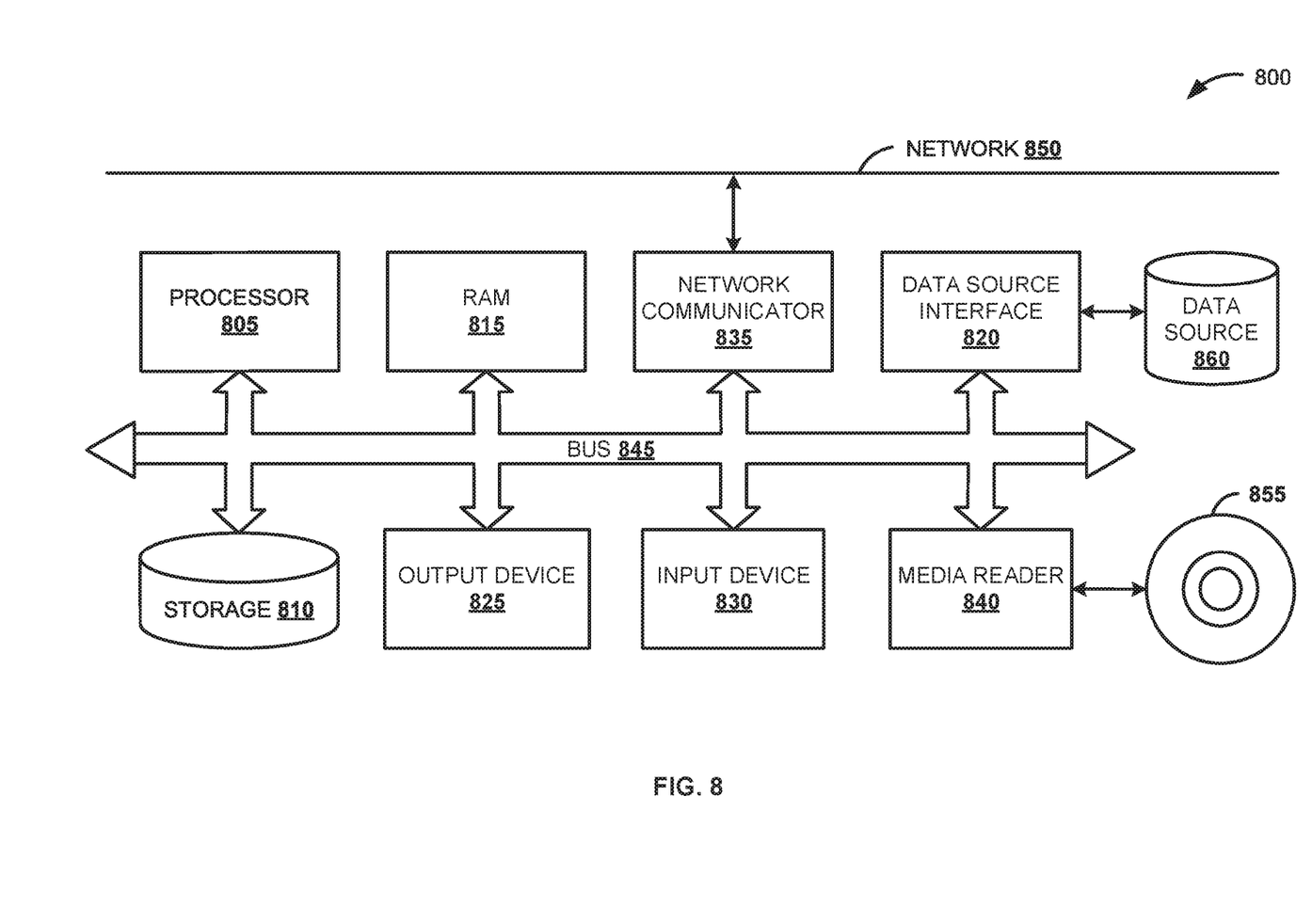
FIG. 8 is a block diagram illustrating an exemplary computer system, according to one embodiment.

FIG. 8 is a block diagram of an exemplary computer system 800. The computer system 800 includes a processor 805 that executes software instructions or code stored on a computer readable storage medium 855 to perform the above-illustrated methods. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
    receive instructions to select a web application in a web based integrated development environment executing in a browser;
    analyze configuration files in the web application by a dependency analysis engine to determine dependent build components;
    determine nested dependencies by recursively analyzing dependencies of the dependent build components;
    when the dependency analysis engine completes the analysis, retrieve the dependent build components from corresponding repositories to a volatile memory associated with the browser in a server system;
    in the server system:
    build the dependent build components to a build result;
    package the build result to an application asset package;
    receive the application asset package at a platform dependent build service;

build the application asset package as a hybrid mobile application, wherein the hybrid mobile application can be executed in online mode and in offline mode; and
publish the hybrid mobile application in an application store.

2. The computer-readable medium of claim 1, wherein the application asset package is a single file including the dependent build components.

3. The computer-readable medium of claim 1, wherein building the dependent build components further comprising instructions which when executed by the computer further causes the computer to:
generate a root page of the web application with bootstrap and script configuration.

4. The computer-readable medium of claim 1, wherein packaging the build result further comprising instructions which when executed by the computer further causes the computer to:
construct the application asset package based on the configuration files in the web application; and
compress the application asset package.

5. The computer-readable medium of claim 1, retrieve the dependent build components further comprising instructions which when executed by the computer further causes the computer to:
acquire assets corresponding to the dependent build components; and
save the retrieved dependent build components in a memory of the browser.

6. A computer-readable medium of claim 1, further comprising instructions which when executed by the computer further causes the computer to:
access the published hybrid mobile application from the application store in a first mobile device.

7. A computer-implemented method for generation of hybrid enterprise mobile applications in a cloud environment, the method comprising:
receiving selection of a web application in a web based integrated development environment executing in a browser;
analyzing configuration files in the web application by a dependency analysis engine to determine dependent build components;
determining nested dependencies by recursively analyzing dependencies of the dependent build components;
when the dependency analysis engine completes the analysis, retrieving the dependent build components from corresponding repositories to a volatile memory associated with the browser in a server system;
in the server system:
building the dependent build components to a build result;
packaging the build result to an application asset package;
receiving the application asset package at a platform dependent build service;
building the application asset package as a hybrid mobile application, wherein the hybrid mobile application can be executed in online mode and in offline mode; and
publishing the hybrid mobile application in an application store.

8. The method of claim 7, wherein packaging the build result to the application asset package further comprising:
packaging the application asset package into a single file including the dependent build components.

9. The method of claim 7, wherein building the dependent build components further comprising:
generating a root page of the web application with bootstrap and script configuration.

10. The method of claim 7, wherein packaging the build result further comprising:
constructing the application asset package based on the configuration files in the web application; and
compressing the application asset package.

11. The method of claim 7, retrieve the dependent build components further comprising:
acquiring assets corresponding to the dependent build components; and
saving the retrieved dependent build components in a memory of the browser.

12. The method of claim 7, further comprising:
receiving the application asset package in a platform dependent build service;
building the application asset package as a hybrid mobile application; and
publishing the hybrid mobile application in an application store.

13. A computer system for generation of hybrid enterprise mobile applications in a cloud environment, comprising:
a computer memory to store program code; and
a processor to execute the program code to:
receive selection of a web application in a web based integrated development environment executing in a browser;
analyze configuration files in the web application by a dependency analysis engine to determine dependent build components;
determine nested dependencies by recursively analyzing dependencies of the dependent build components;
when the dependency analysis engine completes the analysis, retrieve the dependent build components from corresponding repositories to a volatile memory associated with the browser in a server system;
in the server system:
build the dependent build components to a build result;
package the build result to an application asset package;
receive the application asset package at a platform dependent build service;
build the application asset package as a hybrid mobile application, wherein the hybrid mobile application can be executed in online mode and in offline mode; and
publish the hybrid mobile application in an application store.

14. The system of claim 13, wherein the application asset package is a single file including the dependent build components.

15. The system of claim 13, wherein the processor further executes the program code to:
generate a root page of the web application with bootstrap and script configuration.

16. The system of claim 13, wherein the processor further executes the program code to:
construct the application asset package based on the configuration files in the web application; and
compress the application asset package.

17. The system of claim 13, wherein the processor further executes the program code to:
acquire assets corresponding to the dependent build components; and
save the retrieved dependent build components in a memory of the browser.

18. A cloud environment for generation of a hybrid enterprise mobile application, the cloud environment comprising:
- a cloud server executing a web based integrated development environment to:
  - receive selection of a web application in the web based integrated development environment;
  - analyze configuration files in the web application by a dependency analysis engine to determine dependent build components;
  - determine nested dependencies by recursively analyzing dependencies of the dependent build components;
  - when the dependency analysis engine completes the analysis, retrieve the dependent build components from corresponding repositories to a volatile memory associated with the browser;
  - build the dependent build components to a build result;
  - package the build result to an application asset package;
  - receive the application asset package at a platform dependent build service;
  - build the application asset package as the hybrid enterprise mobile application, wherein the hybrid mobile application can be executed in online mode and in offline mode; and
  - publish the hybrid enterprise mobile application in an application store; and
- a cloud client accessing the cloud environment to:
  - download the hybrid enterprise mobile application in the cloud client.

\* \* \* \* \*